US010049350B2

(12) United States Patent
Smith et al.

(10) Patent No.: US 10,049,350 B2
(45) Date of Patent: Aug. 14, 2018

(54) ELEMENT LEVEL PRESENTATION OF ELEMENTS OF A PAYMENT INSTRUMENT FOR EXCEPTIONS PROCESSING

(71) Applicant: BANK OF AMERICA CORPORATION, Charlotte, NC (US)

(72) Inventors: Michael Gerald Smith, Fort Mill, SC (US); Eric Dryer, Charlotte, NC (US); Joshua Allen Beaudry, Jersey City, NJ (US); James F. Barrett, II, Morristown, NJ (US); Shawn Cart Gunsolley, Charlotte, NC (US); Michael Matthew Wisser, Tega Cay, SC (US); Andrew Patrick Bastnagel, Charlotte, NC (US); Marshall Bright Thompson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 380 days.

(21) Appl. No.: 14/750,408

(22) Filed: Jun. 25, 2015

(65) Prior Publication Data

US 2016/0379190 A1    Dec. 29, 2016

(51) Int. Cl.
*G06K 9/00*       (2006.01)
*G06Q 20/10*     (2012.01)
(Continued)

(52) U.S. Cl.
CPC ....... *G06Q 20/102* (2013.01); *G06F 17/3028* (2013.01); *G06K 9/00442* (2013.01); *G06K 9/00449* (2013.01); *G06T 3/40* (2013.01)

(58) Field of Classification Search
CPC ............. G06Q 20/102; G06K 9/00449; G06K 9/00442; G06F 17/3028; G06T 3/40
See application file for complete search history.

(56) References Cited

U.S. PATENT DOCUMENTS 3,737,628 A    6/1973  Azure, Jr.
4,417,136 A   11/1983  Rushby et al.
(Continued)

FOREIGN PATENT DOCUMENTS

EP    671696      9/1995
JP   9282387    10/1997
(Continued)

OTHER PUBLICATIONS

European Search Report dated May 27, 2010 for European Application No. EP 10 25 0246.

(Continued)

*Primary Examiner* — John Strege
(74) *Attorney, Agent, or Firm* — Michael A. Springs; Moore & Van Allen PLLC; Nicholas C. Russell

(57) ABSTRACT

Disclosed are systems, methods, and computer program products that provide for element level presentation of elements of a payment instrument for exceptions processing. More specifically, the invention involves identifying an exception element from an image of a financial document, determining the location of the exception element based on its coordinates within the image of the financial document, and providing a zoomed-in view of the exception element to the user along with information and resources to allow a user to conveniently conduct accurate analysis of the exception element. The system then receives a correct element from the user to replace the exception element, and then processes the financial document using the replaced correct element instead of the exception element.

18 Claims, 10 Drawing Sheets

(51) Int. Cl.
*G06T 3/40* (2006.01)
*G06F 17/30* (2006.01)

(56) References Cited

U.S. PATENT DOCUMENTS

| | | |
|---|---|---|
| 4,523,330 A | 6/1985 | Cain |
| 4,555,617 A | 11/1985 | Brooks et al. |
| 4,947,321 A | 8/1990 | Spence et al. |
| 5,007,100 A | 4/1991 | D'Aoust et al. |
| 5,077,805 A | 12/1991 | Tan |
| 5,121,945 A | 6/1992 | Thomson et al. |
| 5,159,548 A | 10/1992 | Caslavka |
| 5,198,975 A | 3/1993 | Baker et al. |
| 5,257,328 A | 10/1993 | Shimizu |
| 5,326,104 A | 7/1994 | Pease et al. |
| 5,594,226 A | 1/1997 | Steger |
| 5,678,046 A | 10/1997 | Cahill et al. |
| 5,679,940 A | 10/1997 | Templeton et al. |
| 5,740,271 A | 4/1998 | Kunkler et al. |
| 5,754,673 A | 5/1998 | Brooks et al. |
| 5,781,654 A | 7/1998 | Carney |
| 5,842,577 A | 12/1998 | Stevens et al. |
| 5,895,455 A | 4/1999 | Bellinger et al. |
| 5,917,965 A | 6/1999 | Cahill et al. |
| 5,926,392 A | 7/1999 | York et al. |
| 5,940,844 A | 8/1999 | Cahill et al. |
| 5,963,659 A | 10/1999 | Cahill et al. |
| 6,073,121 A | 6/2000 | Ramzy |
| 6,115,494 A | 9/2000 | Sonoda et al. |
| 6,128,401 A | 10/2000 | Suzuki et al. |
| 6,129,273 A | 10/2000 | Shah |
| 6,181,837 B1 | 1/2001 | Cahill et al. |
| 6,188,787 B1 | 2/2001 | Ohmae et al. |
| 6,351,553 B1 | 2/2002 | Hayosh |
| 6,384,844 B1 | 5/2002 | Stewart et al. |
| 6,574,377 B1 | 6/2003 | Cahill et al. |
| 6,600,823 B1 | 7/2003 | Hayosh |
| 6,863,214 B2 | 3/2005 | Garner et al. |
| 6,959,326 B1 | 10/2005 | Day et al. |
| 7,004,382 B2 | 2/2006 | Sandru |
| 7,090,131 B2 | 8/2006 | Natsuno |
| 7,092,561 B2 | 8/2006 | Downs, Jr. |
| 7,124,113 B1 | 10/2006 | Fairclough et al. |
| 7,165,723 B2 | 1/2007 | McClamery et al. |
| 7,349,884 B1 | 3/2008 | Odom et al. |
| RE40,220 E | 4/2008 | Nichols et al. |
| 7,379,978 B2 | 5/2008 | Anderson et al. |
| 7,389,914 B1 | 6/2008 | Enright et al. |
| 7,391,934 B2 | 6/2008 | Goodall et al. |
| 7,461,775 B2 | 12/2008 | Swift et al. |
| 7,471,818 B1 | 12/2008 | Price et al. |
| 7,494,052 B1 | 2/2009 | Carpenter et al. |
| 7,606,408 B2 | 10/2009 | Takiguchi |
| 7,680,317 B2 | 3/2010 | Adelberg et al. |
| 7,680,318 B2 | 3/2010 | Agrawal et al. |
| 7,689,025 B2 | 3/2010 | Takiguchi |
| 7,693,305 B2 | 4/2010 | Emerson et al. |
| 7,697,728 B2 | 4/2010 | Emerson et al. |
| 7,702,588 B2 | 4/2010 | Gilder et al. |
| 7,706,275 B2 | 4/2010 | Archer et al. |
| 7,735,721 B1 | 6/2010 | Ma et al. |
| 7,752,286 B2 | 7/2010 | Anderson |
| 7,757,938 B2 | 7/2010 | Richardson et al. |
| 7,769,772 B2 | 8/2010 | Weyl et al. |
| 7,856,403 B2 | 12/2010 | Venturo et al. |
| 7,950,698 B2 | 5/2011 | Popadic et al. |
| 7,962,412 B2 | 6/2011 | Omura et al. |
| 7,970,706 B2 | 6/2011 | Keene |
| 8,045,818 B2 | 10/2011 | Sato et al. |
| 8,052,040 B2 | 11/2011 | Stover |
| 8,155,425 B1* | 4/2012 | Mandel ............... G06K 9/2063 |
| | | 382/100 |
| 8,162,125 B1 | 4/2012 | Csulits et al. |
| 8,229,203 B2 | 7/2012 | Faulkner et al. |
| 8,358,826 B1 | 1/2013 | Medina et al. |
| 8,437,529 B1* | 5/2013 | Mennie ............... G06Q 20/042 |
| | | 209/534 |
| 8,438,427 B2 | 5/2013 | Beck et al. |
| 8,467,591 B1 | 6/2013 | Csulits |
| 8,516,301 B2 | 8/2013 | Beck et al. |
| 8,606,705 B2 | 12/2013 | Zanzot et al. |
| 8,655,047 B1 | 2/2014 | Walker et al. |
| 8,712,143 B2 | 4/2014 | Tran |
| 8,864,029 B2 | 10/2014 | McGlamery et al. |
| 9,176,760 B2 | 11/2015 | Halambi et al. |
| 9,317,484 B1* | 4/2016 | Ho ..................... G06F 17/2725 |
| 9,436,623 B2 | 9/2016 | Wertheimer et al. |
| 9,779,392 B1 | 10/2017 | Prasad et al. |
| 2001/0051921 A1 | 2/2001 | Garner, IV et al. |
| 2001/0006556 A1 | 7/2001 | Graves et al. |
| 2002/0000995 A1* | 1/2002 | Sawada ............... G09G 1/165 |
| | | 345/620 |
| 2002/0023053 A1 | 2/2002 | Szoc et al. |
| 2002/0037097 A1 | 3/2002 | Hoyos et al. |
| 2002/0067846 A1 | 6/2002 | Foley |
| 2002/0104782 A1 | 8/2002 | DeWitt et al. |
| 2002/0169861 A1 | 11/2002 | Chang et al. |
| 2003/0140007 A1 | 7/2003 | Kramer et al. |
| 2003/0208440 A1 | 11/2003 | Harada et al. |
| 2003/0236877 A1 | 12/2003 | Allan |
| 2004/0076320 A1 | 4/2004 | Downs |
| 2004/0131242 A1 | 7/2004 | Klevtsov |
| 2004/0133516 A1 | 7/2004 | Buchanan et al. |
| 2004/0215560 A1 | 10/2004 | Amalraj et al. |
| 2004/0217170 A1 | 11/2004 | Takiguchi et al. |
| 2005/0010524 A1 | 1/2005 | Gutbrod et al. |
| 2005/0094861 A1 | 5/2005 | Prakash et al. |
| 2005/0097019 A1* | 5/2005 | Jacobs ............... G06Q 20/042 |
| | | 705/35 |
| 2005/0139670 A1* | 6/2005 | McGlamery ........... G06K 9/03 |
| | | 235/449 |
| 2005/0139671 A1 | 6/2005 | McGlamery et al. |
| 2005/0144189 A1 | 6/2005 | Edwards et al. |
| 2005/0160039 A1* | 7/2005 | Garner, IV ...... G06F 17/30011 |
| | | 705/45 |
| 2005/0189272 A1 | 9/2005 | DiBiaso et al. |
| 2005/0281449 A1 | 12/2005 | Takiguchi |
| 2005/0281450 A1 | 12/2005 | Richardson |
| 2006/0031122 A1 | 2/2006 | Lane et al. |
| 2006/0041506 A1 | 2/2006 | Mason et al. |
| 2006/0088199 A1 | 4/2006 | Shizuka et al. |
| 2006/0095364 A1 | 5/2006 | Hamilton et al. |
| 2006/0106717 A1 | 5/2006 | Randle et al. |
| 2006/0144937 A1 | 7/2006 | Heilper et al. |
| 2006/0184441 A1 | 8/2006 | Haschka et al. |
| 2006/0186194 A1 | 8/2006 | Richardson et al. |
| 2006/0191998 A1 | 8/2006 | Mueller et al. |
| 2006/0219773 A1 | 10/2006 | Richardson |
| 2007/0019855 A1 | 1/2007 | Marlett et al. |
| 2007/0045930 A1 | 3/2007 | Hayduchok et al. |
| 2007/0061260 A1 | 3/2007 | deGroeve et al. |
| 2007/0064991 A1 | 3/2007 | Douglas et al. |
| 2007/0156438 A1 | 7/2007 | Popadic et al. |
| 2007/0162387 A1 | 7/2007 | Cataline et al. |
| 2007/0172109 A1 | 7/2007 | Agrawal et al. |
| 2007/0198437 A1 | 8/2007 | Eisner et al. |
| 2007/0215691 A1 | 9/2007 | Swift et al. |
| 2007/0217669 A1 | 9/2007 | Swifft et al. |
| 2007/0267477 A1 | 11/2007 | Schott et al. |
| 2007/0288382 A1 | 12/2007 | Narayanan et al. |
| 2008/0015985 A1 | 1/2008 | Abhari et al. |
| 2008/0040249 A1 | 2/2008 | Re et al. |
| 2008/0063278 A1 | 3/2008 | Vincent et al. |
| 2008/0086420 A1 | 4/2008 | Gilder et al. |
| 2008/0135610 A1 | 6/2008 | Roh |
| 2008/0137939 A1 | 6/2008 | Wang et al. |
| 2008/0140552 A1 | 6/2008 | Blaikie |
| 2008/0168439 A1 | 7/2008 | Anderson et al. |
| 2008/0195537 A1 | 8/2008 | Schulz |
| 2008/0232648 A1 | 9/2008 | Emerson et al. |
| 2008/0262950 A1* | 10/2008 | Christensen ......... G06Q 20/042 |
| | | 705/30 |
| 2008/0279455 A1 | 11/2008 | Wall |
| 2008/0284799 A1 | 11/2008 | Hollemans et al. |

(56) References Cited

U.S. PATENT DOCUMENTS

| | | |
|---|---|---|
| 2008/0290181 A1 | 11/2008 | Dimitri et al. |
| 2008/0294554 A1 | 11/2008 | Neotytides et al. |
| 2009/0018960 A1 | 1/2009 | Gawne |
| 2009/0034848 A1 | 2/2009 | Sakamoto et al. |
| 2009/0034849 A1 | 2/2009 | Grosvenor |
| 2009/0037339 A1 | 2/2009 | Ancell et al. |
| 2009/0114715 A1 | 5/2009 | Mueller et al. |
| 2009/0164372 A1 | 6/2009 | Dell et al. |
| 2009/0236413 A1 | 9/2009 | Mueller et al. |
| 2009/0324053 A1 | 12/2009 | Ross et al. |
| 2010/0036775 A1 | 2/2010 | Edens |
| 2010/0122216 A1 | 5/2010 | Song et al. |
| 2010/0211499 A1 | 8/2010 | Zanzot et al. |
| 2010/0280859 A1 | 11/2010 | Frederick, II |
| 2010/0280871 A1 | 11/2010 | Goertz et al. |
| 2011/0091092 A1 | 4/2011 | Nepomniachtchi et al. |
| 2011/0206266 A1 | 8/2011 | Faulkner et al. |
| 2011/0219208 A1 | 9/2011 | Asaad et al. |
| 2011/0251956 A1 | 10/2011 | Cantley et al. |
| 2011/0264572 A1 | 10/2011 | Cucinotta |
| 2011/0280450 A1 | 11/2011 | Nepomniachtchi et al. |
| 2012/0140624 A1 | 6/2012 | Denman et al. |
| 2012/0189186 A1 | 7/2012 | Csulits et al. |
| 2013/0056531 A1 | 3/2013 | Sato et al. |
| 2013/0067069 A1 | 3/2013 | Allen et al. |
| 2013/0067074 A1 | 3/2013 | Allen et al. |
| 2013/0124414 A1 | 5/2013 | Roach et al. |
| 2013/0185200 A1 | 7/2013 | Neinast et al. |
| 2013/0229911 A1 | 9/2013 | Nagata et al. |
| 2013/0239185 A1 | 9/2013 | Orttung et al. |
| 2013/0243303 A1 | 9/2013 | Imae et al. |
| 2013/0287284 A1 | 10/2013 | Nepomniachtchi et al. |
| 2013/0325706 A1 | 12/2013 | Wilson et al. |
| 2014/0052697 A1 | 2/2014 | Williams et al. |
| 2014/0112282 A1 | 4/2014 | Wijting et al. |
| 2014/0153787 A1* | 6/2014 | Schmidtler ........ G06K 9/00469 382/112 |
| 2014/0164194 A1 | 6/2014 | Landry, Jr. et al. |
| 2014/0195967 A1* | 7/2014 | Abe ...................... G06F 3/0485 715/798 |
| 2014/0233835 A1 | 8/2014 | Sandoz et al. |
| 2014/0233837 A1 | 8/2014 | Sandoz et al. |
| 2014/0359472 A1* | 12/2014 | Lefor ................ H04M 1/72569 715/746 |
| 2015/0012442 A1 | 1/2015 | Ceribelli et al. |
| 2015/0378539 A1* | 12/2015 | Nickolaevich ........ G06F 17/273 715/255 |
| 2016/0182328 A1 | 6/2016 | Bhasin et al. |

FOREIGN PATENT DOCUMENTS

| | | |
|---|---|---|
| WO | WO 2005066880 | 7/2005 |
| WO | WO 2005081917 | 9/2005 |

OTHER PUBLICATIONS

International Search Report and the Written Opinion of the International Searching Authority dated Apr. 12, 2010 for International Application No. PCT/US2010/24123 dated Apr. 2, 2010 for International Application No. PCT/US 10/24123.
International Search Report and the Written Opinion of the International Searching Authority received Apr. 19, 2010 for International Application No. PCT/US2010/24113 dated Apr. 12, 2010 for International Application No. PCT/US 10/24113.
Extended European Search Report dated Jun. 1, 2010 for European Application No. EP 10 25 0245.
Instituto Mexicano de la Propiedad Industrial. Mexico Office Action dated May 29, 2012 Mexico Application No. MX/a/2010/001718. Name of Applicant: Bank of America Corporation. Spanish Language. 3 pages.
European Patent Office. European Application No. 10 250 245.7-1955. European Office Action dated May 6, 2013. Name of Applicant: Bank of America Corporation. 7 pages.
Instituto Mexicano de la Propiedad Industrial. Mexico Office Action dated Apr. 8, 2013. Mexico Application No. MX/a/2010/001717. Name of Applicant: Bank of America Corporation. Spanish Language. 3 pages.
Instituto Mexicano de la Propiedad Industrial. Mexico Office Action dated Apr. 8, 2013. Mexico Application No. MX/a/2010/001717. Name of Applicant: Bank of America Corporation. English Language Summary. 1 page.
Instituto Mexicano de la Propiedad Industrial. Mexico Office Action dated May 29, 2012. Mexico Application No. MX/a/2010/001718. Name of Applicant: Bank of America Corporation. English Language Summary. 1 page.
Examination Report for related European Patent Application No. 10250246.5 dated Oct. 22, 2013.
International Preliminary Report on Patentability dated Aug. 25, 2011 for PCT/US2010/024113.
International Preliminary Report on Patentability dated Aug. 25, 2011 for PCT/US2010/024123.
"Instant verification of check quality and usability," Parascript, LLC, Longmont, Colorado, retrieved from the World Wide Web on Jul. 17, 2012, 2 pages.
"Check 21: Harnessing a Billion Points of Light," Mercator Advisory Group, May 24, 2004, Maynard, Massachusetts, retrieved from the Internet on Oct. 3, 2015; 3 pages.
"Check Encoders," Starex Financial Systems—Banking Equipment.com, Northridge, California, retrieved from the World Wide Web on Jul. 17, 2012, 3 pages.
"Let's face it—it's hard to keep up," Silver Bullet Technology, Inc., Pensacola, Florida, retrieved from the World Wide Web on Jul. 17, 2012, 2 pages.
Klein, Bob, et al., "Image Quality and Usability Assurance: Phase 1 Project," The Financial Services Technology Consortium (Available from BITS—The Financial Services Roundtable, Washington, D.C.), Aug. 23, 2004, 68 pages.
"Electronic check processing solutions: Choosing the right option for retail payments," First Data, 2008, Atlanta, Georgia; 16 pages.
"Reduce exception item processing costs: New technology paves the way to new saving," Cummins Allison Corporation, Mt. Prospect, Illinois, retrieved from the Internet on Oct. 3, 2015, 6 pages.
"Check 21 and Image Security," The Standard Register Company, Dec. 8, 2003, Wayne, New Jersey, 9 pages.
"X9LIB Software Development Toolkit," All My Papers, Aug. 8, 2012, Saratoga, California, 3 pages.
"MICR V Encoder M-570D," Progressive Business Systems, Inc., 2011, Auburn, Georgia, 2 pages.
"Correcting the Codeline (MICR line)," Financial Management Service—A Bureau of the United States Department of the Treasury, Washington, D.C, retrieved from the World Wide Web on Jul. 18, 2012, 4 pages.
"Vision IP:Check21—Delivering an end-to-end, image-enabled electronic payments environment," Metavante Corporation, 2008, Milwaukee, Wisconsin, 5 pages.
Higgins, R., "Ramifications of MICR Mismatch in Check Image Exchange", All My Papers Publication, Jan. 2008, 16 pages.
Malchar, R., "The Value of MICR for the Remote Check Depositor", PANINI Advanced Solutions for Document Processing, 2008, 24 pages.
Higgins, R., "Small Check Scanner MICR Read Performance Benchmark Study", Feb. 27, 2006, 7 pages.
Canadian Office Action dated Oct. 30, 2012 for Application No. 2,546,849.
International Preliminary Report on Patentability for International Application No. PCT/US2004/043832 dated Jul. 3, 2006.
International Search Report for International Application No. PCT/US2004/043832 dated May 19, 2005.
Written Opinion for International Application No. PCT/US2004/043832 received May 17, 2005.

* cited by examiner

ELEMENT LEVEL PRESENTATION OF ELEMENTS OF A PAYMENT INSTRUMENT FOR EXCEPTIONS PROCESSING

FIELD OF THE INVENTION

This invention generally relates to the field of processing financial documents.

BACKGROUND

Processing images of financial documents are an important aspect of a financial institution's business, so accurate and efficient systems, products, and methods of processing the images of financial documents are desired. A significant obstacle to processing images of financial documents is elements or characters from the image of the financial document that are difficult to decipher with automated technology. As such, a need exists to improve the systems, products, and methods for analyzing these exception elements.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for element level presentation of elements of a payment instrument for exceptions processing. More specifically, the invention involves identifying an exception element from an image of a financial document, determining the location of the exception element based on its coordinates within the image of the financial document, and providing a zoomed-in view of the exception element to the user along with information and resources to allow a user to conveniently conduct accurate analysis of the exception element. The system then receives a correct element from the user to replace the exception element, and then processes the financial document using the replaced correct element instead of the exception element.

A system for element level presentation of elements of a payment instrument for exceptions processing defines first embodiments of the invention. The system comprises a computing platform comprising one or more processing devices and executable software code stored in one or more electronic storage devices. The executable software code is configured to cause the one or more processing devices to receive an image of a financial document and lift financial data off of the financial document using an optical character recognition (OCR) process. The executable software code of the system is further configured to store the financial data as information related to the financial document. Additionally, the executable code of the system is further configured to identify an exception element in financial document processing, wherein the exception element is not discernible by the system, and wherein the system cannot process the information related to the financial document with the exception element.

Continuing the description of the first embodiments of the invention, the executable software code of the system is further configured to determine the coordinates of the exception element within the image of the financial document and then provide a zoomed-in view of the financial document to a user at the determined coordinates. The executable software code may be further configured to prompt the user to select a correct element, wherein the correct element is an element intended by a creator of the exception element. The system further includes executable software code configured to receive the user selection of the correct element and replace the exception element with the selected correct element, wherein replacing the exception element converts the information related to the financial document into a format that can be processed by the system. Finally, the executable software code of the system may be configured to process the financial document based on the information related to the financial document and the selected correct element.

In one embodiment of the system, the executable software code is further configured to cause the one or more processing devices to provide a user interface to the user, wherein the user interface includes a display, a navigation mechanism, and a user input mechanism. In such an embodiment, the user input mechanism may comprise a touchscreen, wherein the touchscreen includes selectable icons associated with one or more possible correct elements. Additionally, these selectable icons may be positioned at least as far apart as a human fingertip, so as to reduce the risk of mis-typing a correct element. In some embodiments of the system, the navigation mechanism is configured for further manipulating the amount of zoom, relative to the exception element.

In still further specific embodiments of the system, the display comprises a first section comprising the zoomed-in view of the exception element, and a second section comprising a full view of the image of the financial document. In some embodiments, the display further comprises a brightness control, wherein the brightness control manipulates the brightness of the first section of the display but does not affect the brightness of the second section of the display. The display may also comprise a contrast control, wherein the contrast control manipulates the contrast of the first section of the display, but does not affect the contrast of the second section of the display.

A computer implemented method for element level presentation of elements of a payment instrument for exceptions processing defines second embodiments of the invention. The computer implemented method includes receiving, via a processing device, an image of a financial document, and lifting, via a processing device, financial data off of the financial document using OCR. Additionally, the computer implemented method comprises storing, via a processing device, the financial data as information related to the financial document. The computer implemented method further comprises identifying, via a processing device, an exception element in financial document processing, wherein the exception element is not discernible by the system, and wherein the system cannot process the information related to the financial document with the exception element.

Some embodiments of the computer implemented method further comprise determining, via a processing device, the coordinates of the exception element within the image of the financial document, and providing, via a user interface, a zoomed-in view of the financial document to a user at the determined coordinates. Additionally, the computer implemented method may further comprise prompting, via a processing device, the user to select a correct element, wherein the correct element is an element intended by a creator of the exception element.

The computer implemented method may also include receiving, via the user interface, the exception element with the selected correct element, wherein replacing the exception element converts the information related to the financial document into a format that can be processed by the system. Finally, the computer implemented method may include processing, via a processing device, the financial document based on the information related to the financial document and the selected correct element.

Specific embodiments of the computer implemented method include providing, via the user interface, a display, a navigation mechanism, and a user input mechanism. In such embodiments, the user input mechanism may comprise a touchscreen with selectable icons associated with one or more possible elements. Additionally, these selectable icons may be positioned at least as far apart as a human fingertip, so as to reduce the risk of mis-typing a correct element. The navigation mechanism of this computer implemented method may be configured for further manipulating the amount of zoom, relative to the exception element.

In some specific embodiments of this computer implemented method, the display comprises a first section comprising a zoomed-in view of the exception element, and a second section comprising a full view of the image of the financial document. In such an embodiment, the display of the computer implemented method may further comprise a brightness control, wherein the brightness control manipulates the brightness of the first section of the display but does not affect the brightness of the second section of the display. Additionally, the display may comprise a contrast control, wherein the contrast control manipulates the contrast of the first section of the display, but does not affect the contrast of the second section of the display.

A computer program product for element level presentation of elements of a payment instrument for exceptions processing defines third embodiments of the invention. The computer program product comprises a non-transitory computer readable medium comprising computer readable instructions. The computer readable instructions of the computer program product includes instructions for receiving an image of a financial document and lifting financial data off of the financial document using OCR.

The computer readable instructions may further comprise instructions for storing the financial data as information related to the financial document. Additionally, the computer readable instructions may include instructions for identifying an exception element in financial document processing, wherein the exception element is not discernible by the system, and wherein the system cannot process the information related to the financial document with the exception element.

The computer readable instructions may further include instructions for determining the coordinates of the exception element within the image of the financial document, and providing a zoomed-in view of the financial document to a user at the determined coordinates. The computer readable instructions may then include instructions for prompting the user to select a correct element, wherein the correct element is an element intended by the creator of the exception element.

The computer program product may further comprise computer readable instructions for receiving the user selection of the correct element and for replacing the exception element with the selected correct element, wherein replacing the exception element converts the information related to the financial document into a format that can be processed by the system. Finally, the computer readable instructions may include instructions for processing the financial document based on the information related to the financial document and the selected correct element.

In some embodiments of the computer program product, the computer readable instructions further comprise providing a user interface to the user, wherein the user interface includes a display, a navigation mechanism, and a user input mechanism. In such an embodiment, the user input mechanism comprises a touchscreen with selectable icons associated with one or more possible correct elements. Additionally, the selectable icons may be positioned at least as far apart as a human fingertip to reduce the risk of mis-typing the correct element. In other embodiments of the computer program product, the computer readable instructions comprise instructions to configure the navigation mechanism for further manipulating the amount of zoom, relative to the exception element.

Additionally, the display of the user interface provided by the computer program product may comprise a first section comprising the zoomed-in view of the exception element, a second section comprising a full view of the image of the financial document, a brightness control, wherein the brightness control manipulates the brightness of the first section of the display but does not affect the brightness of the second section of the display, and a contrast control, wherein the contrast control manipulates the contrast of the first section of the display but does not affect the contrast of the second section of the display.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
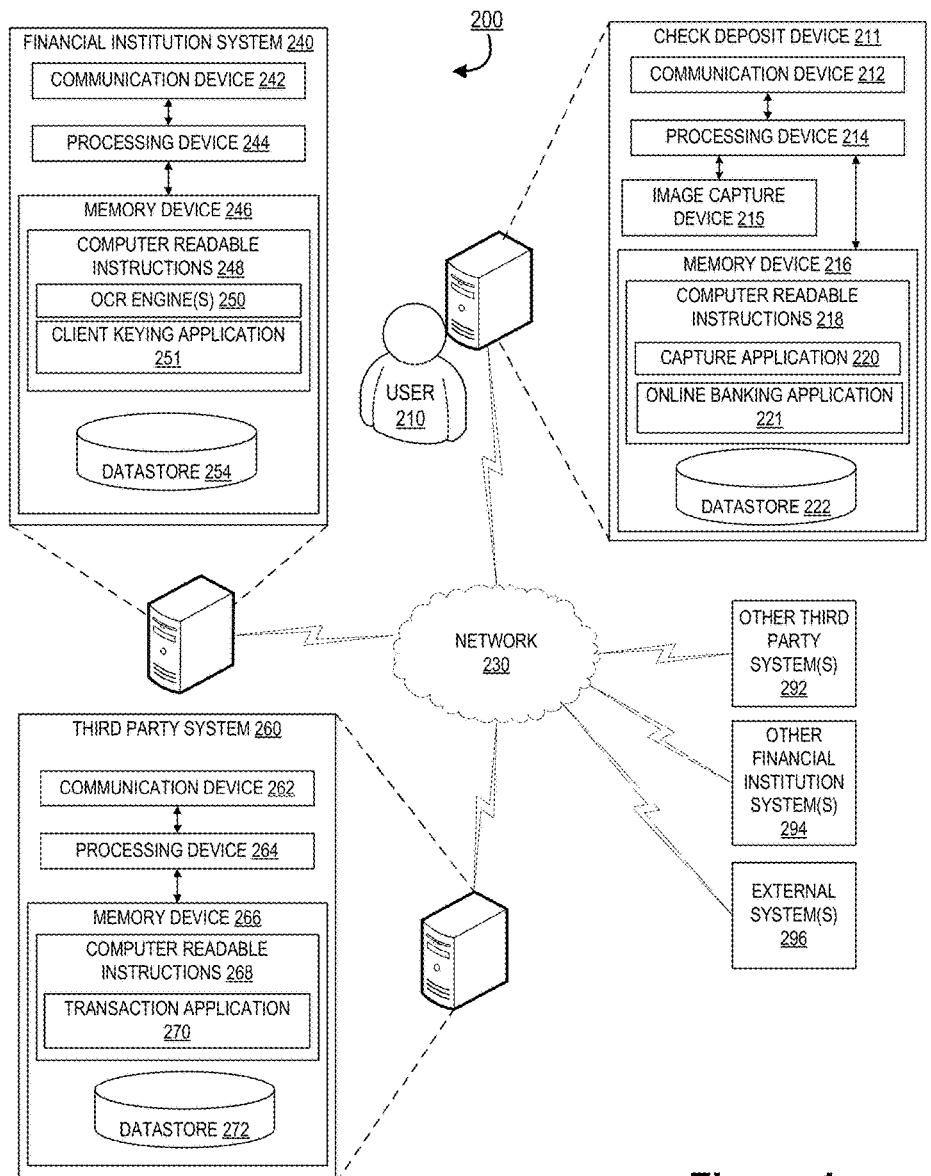
Figure 2A:
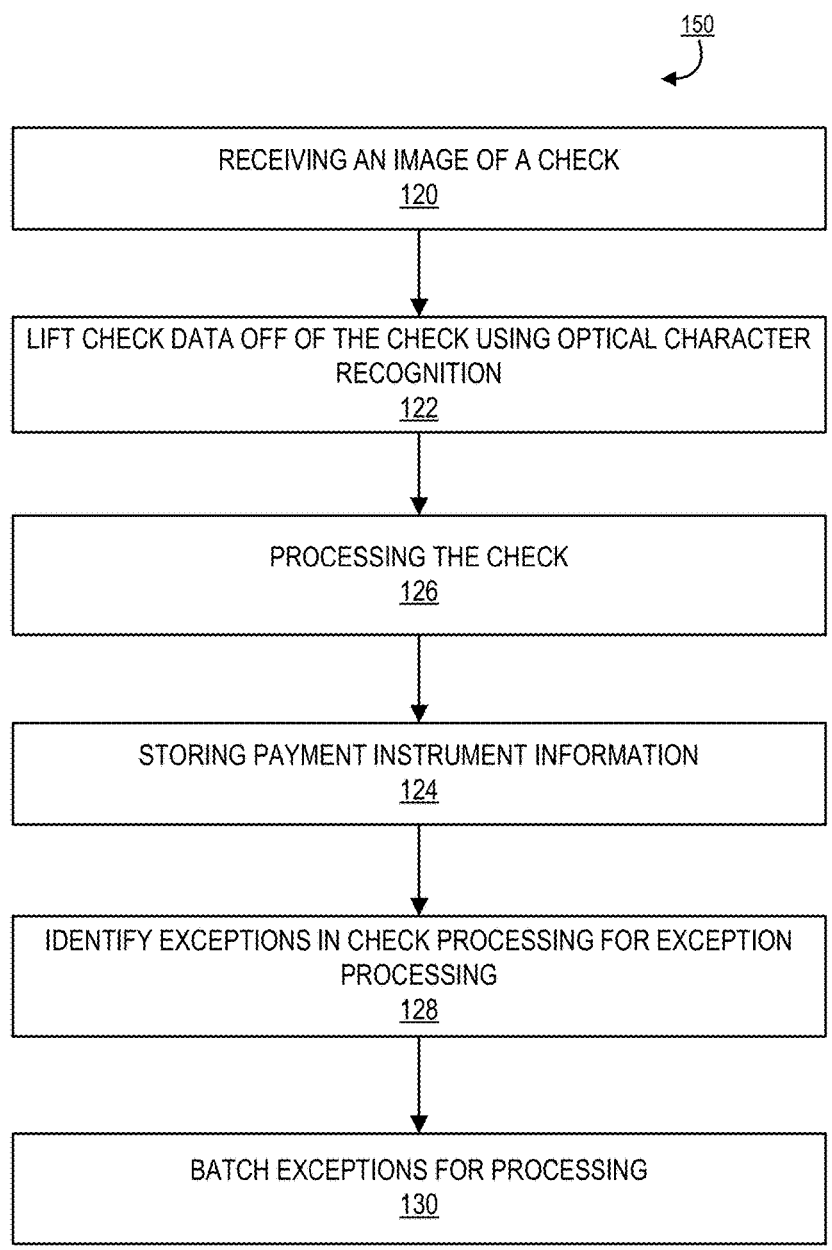
Figure 2B:
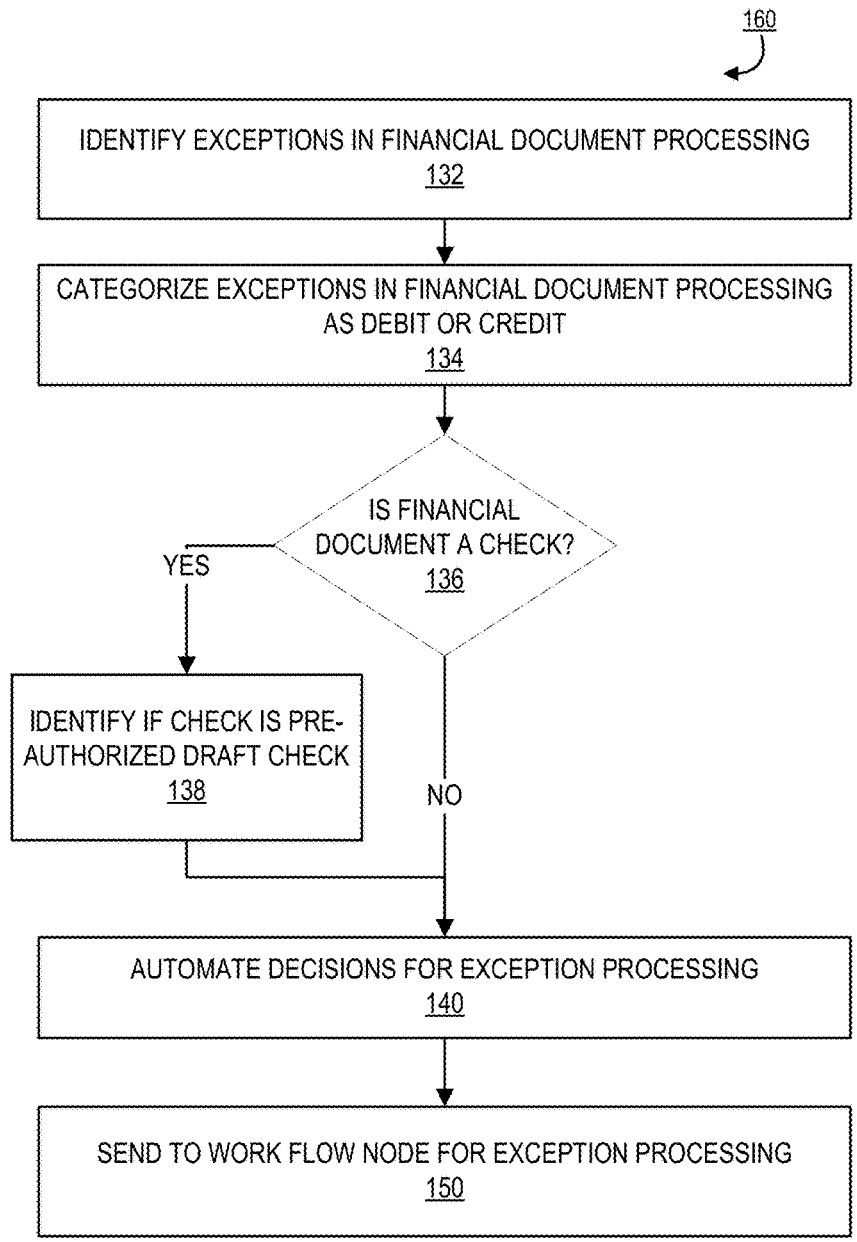
Figure 3:
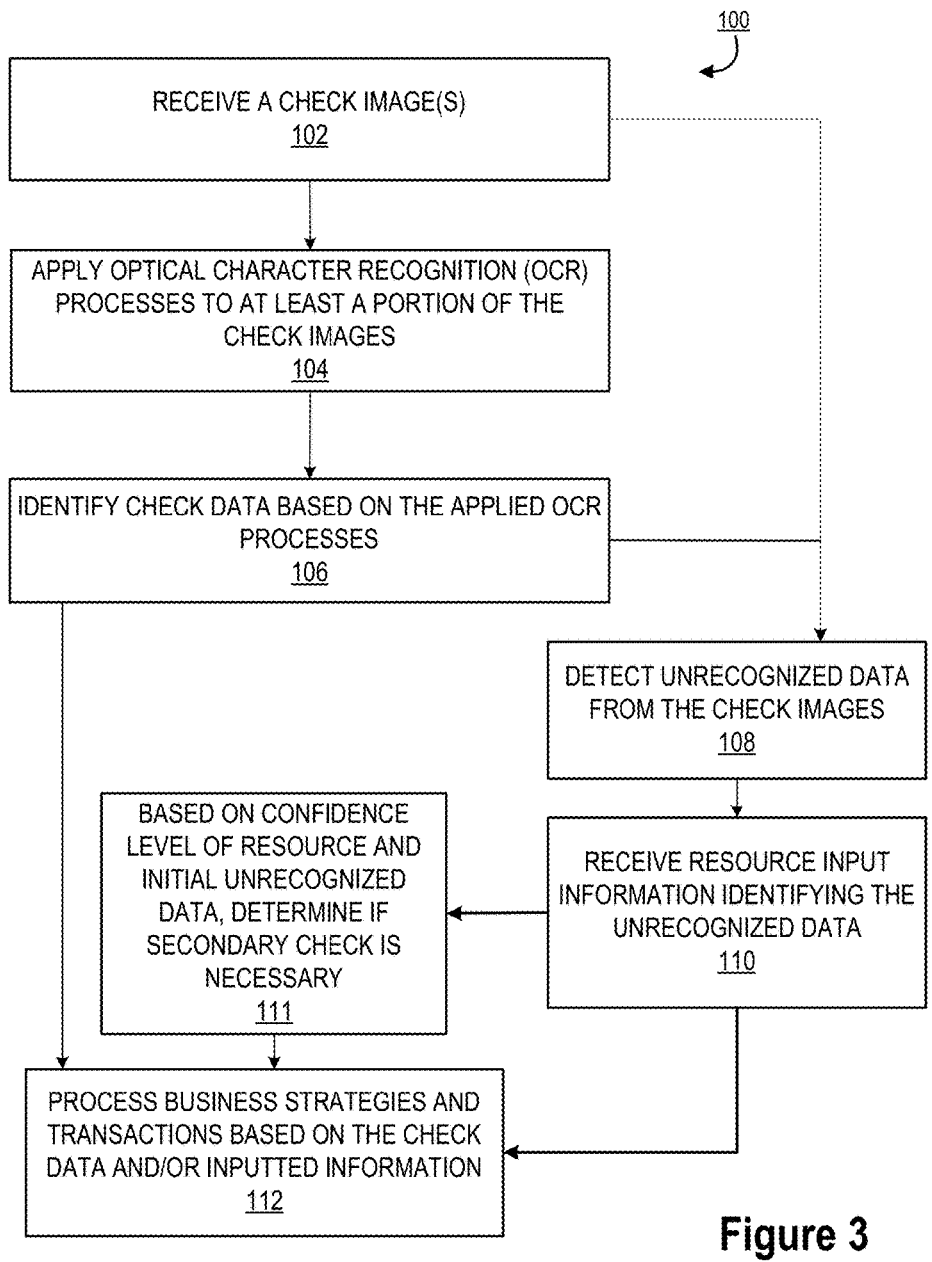
Figure 4:
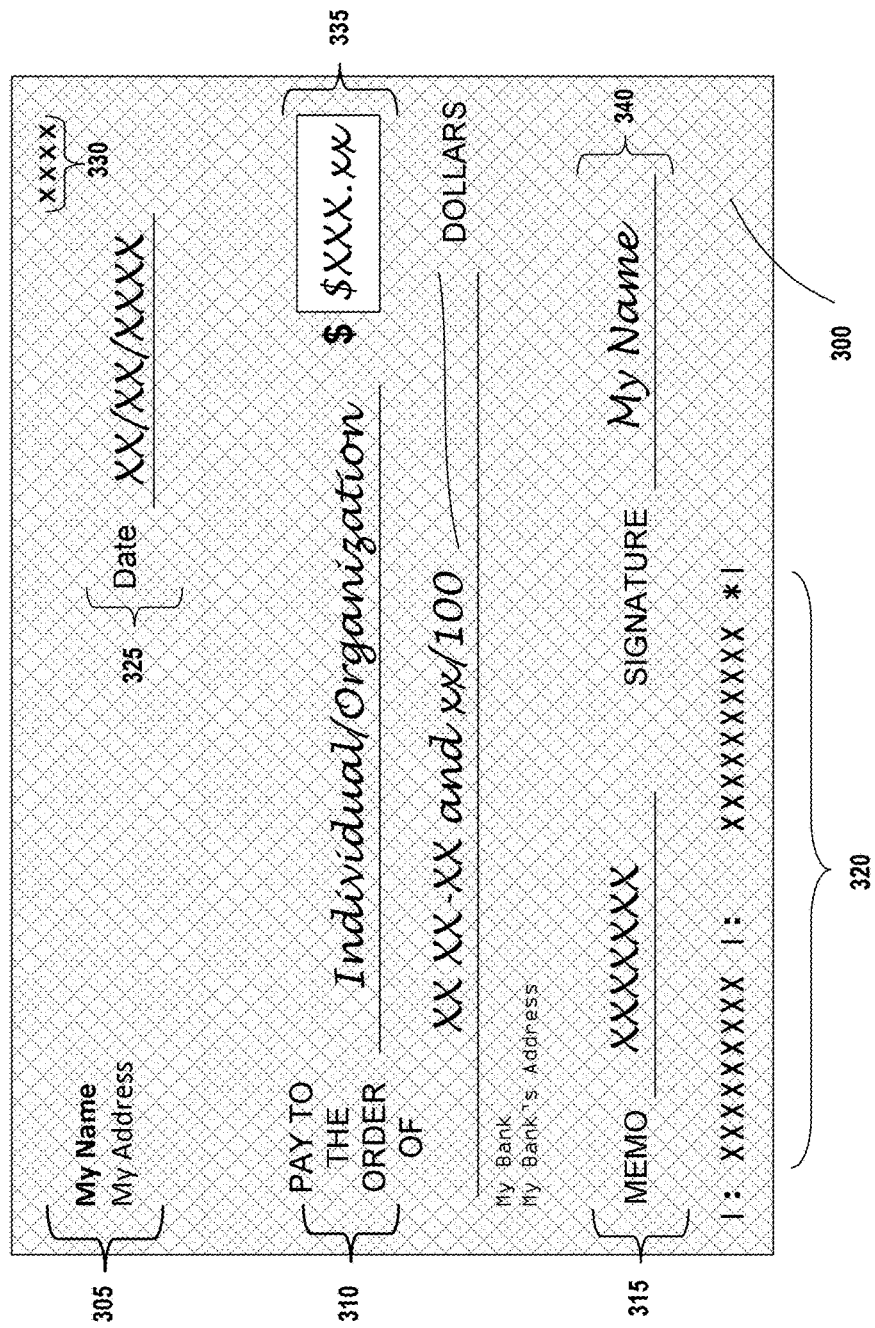
Figure 5:
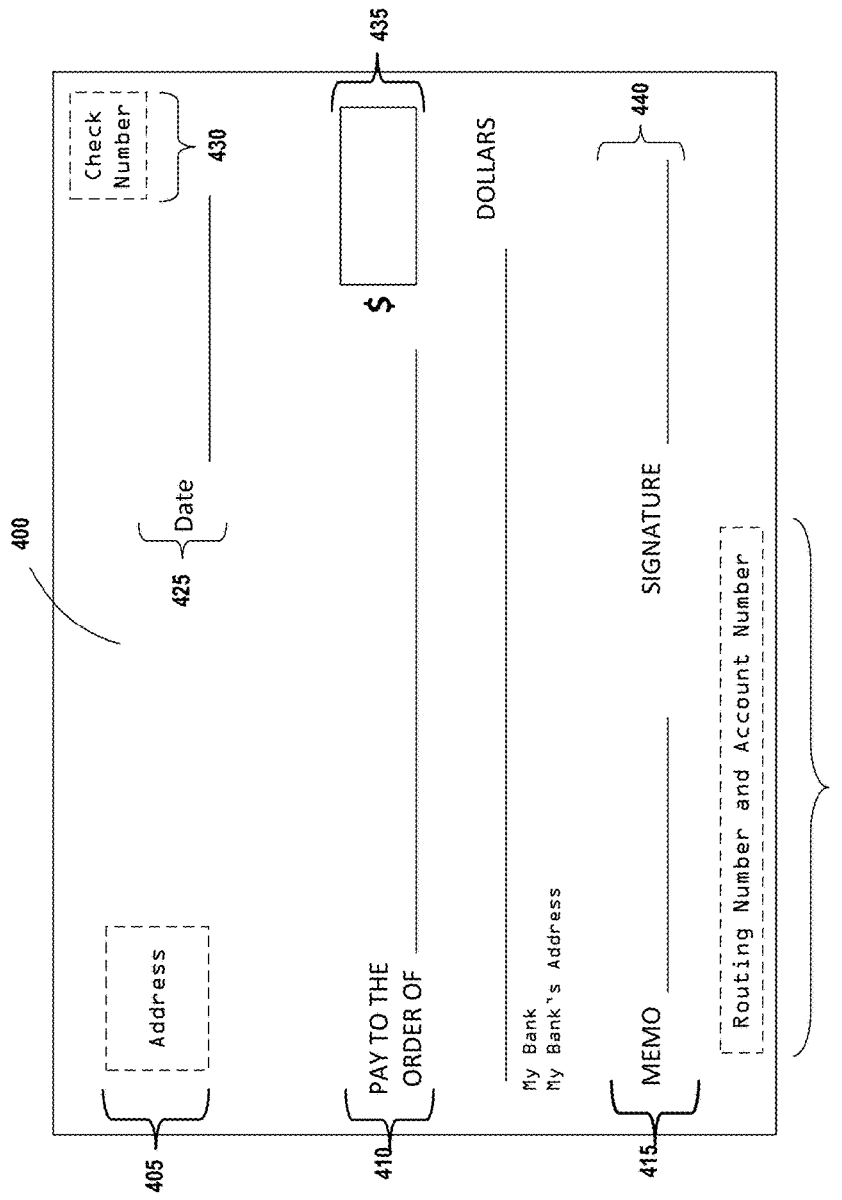
Figure 6:
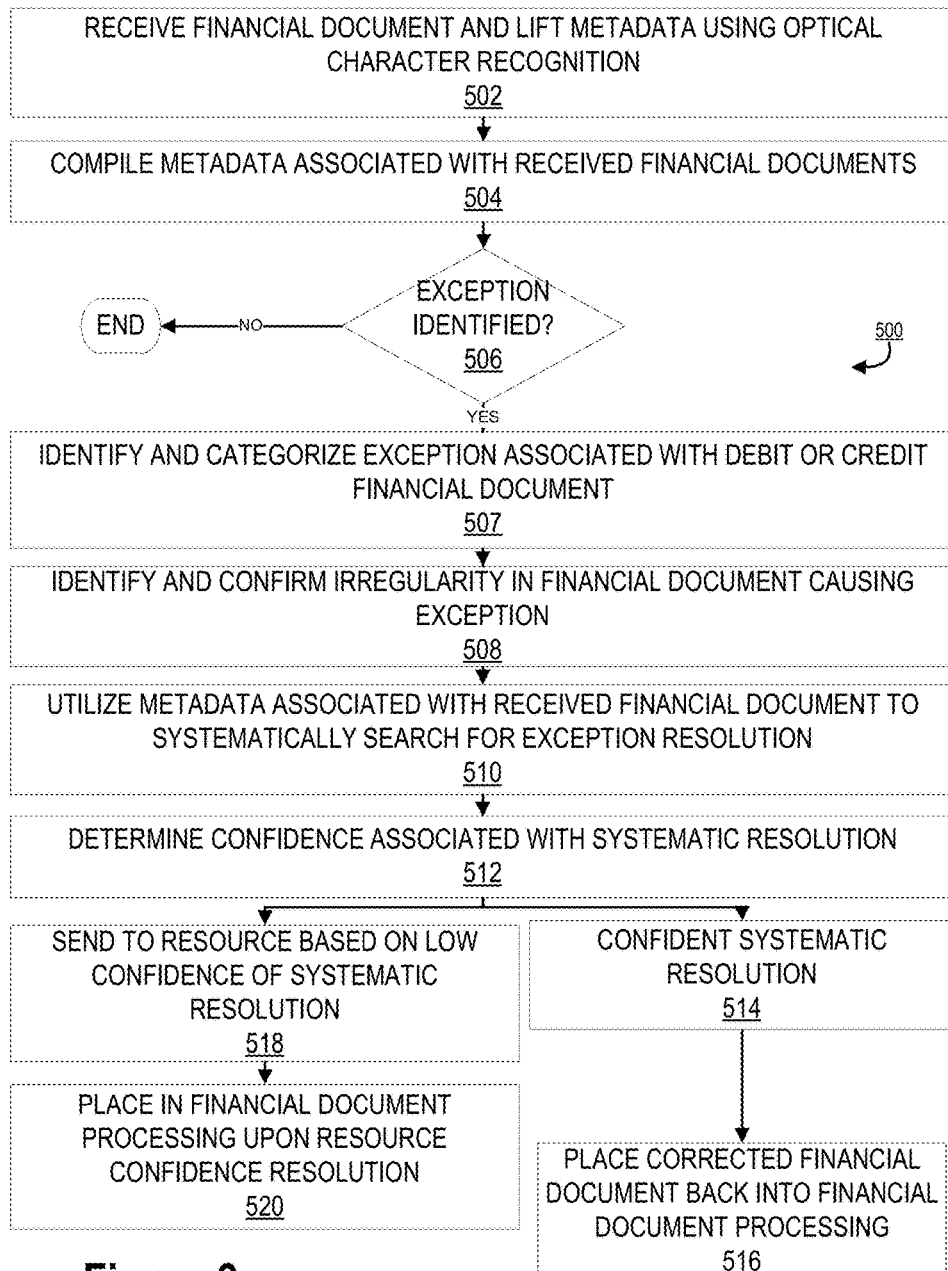
Figure 7:
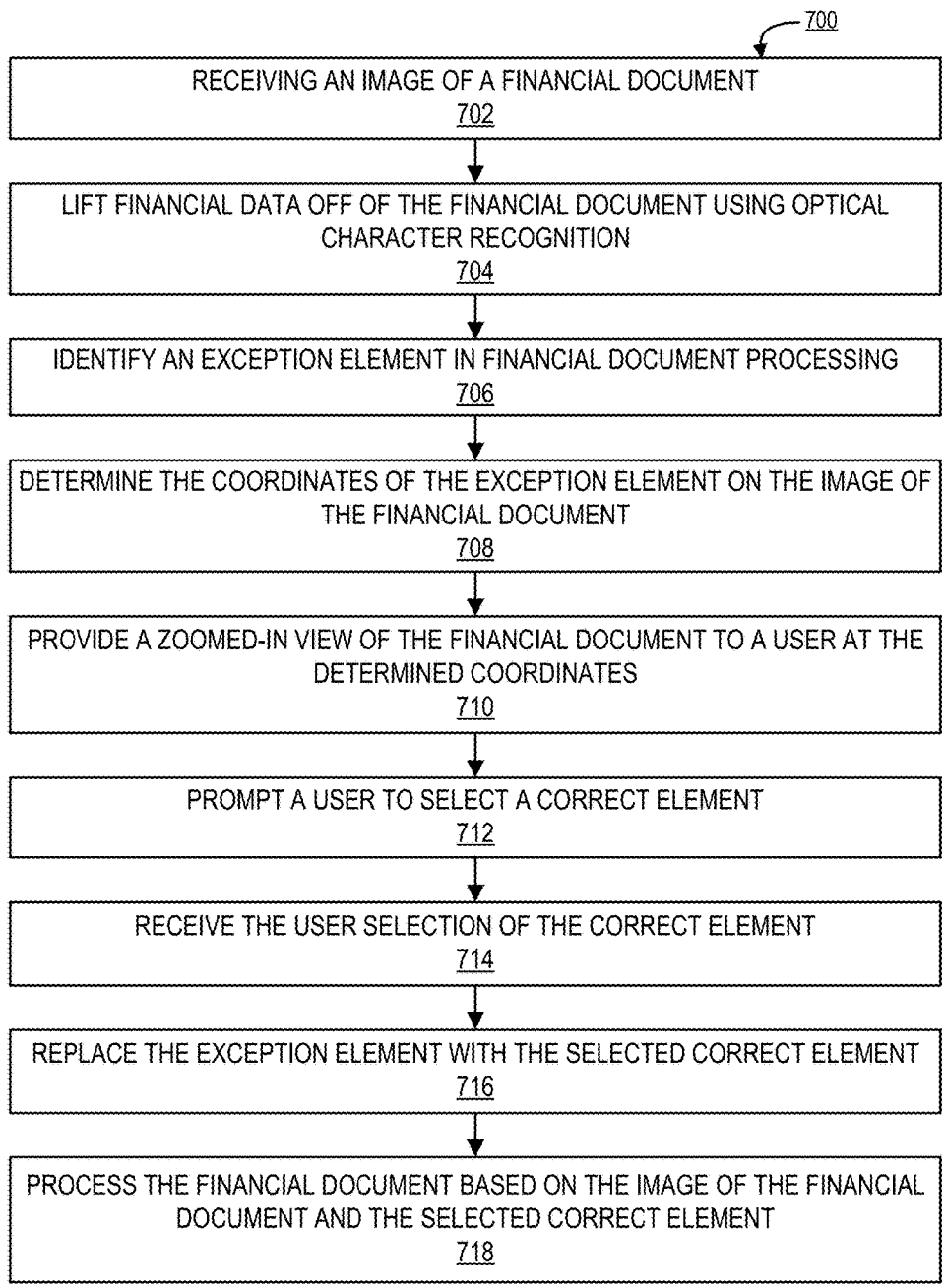
Figure 8:
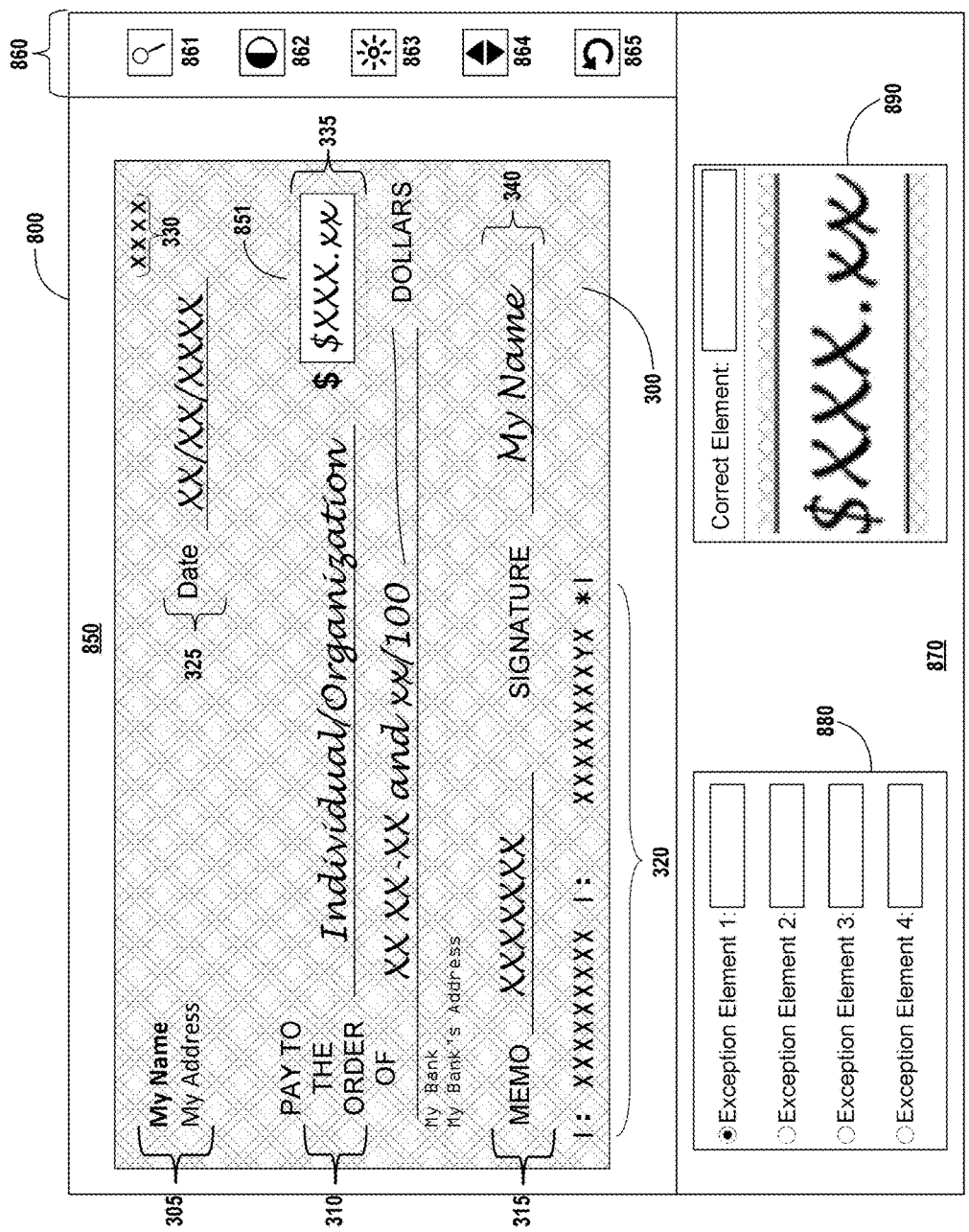
Figure 9:
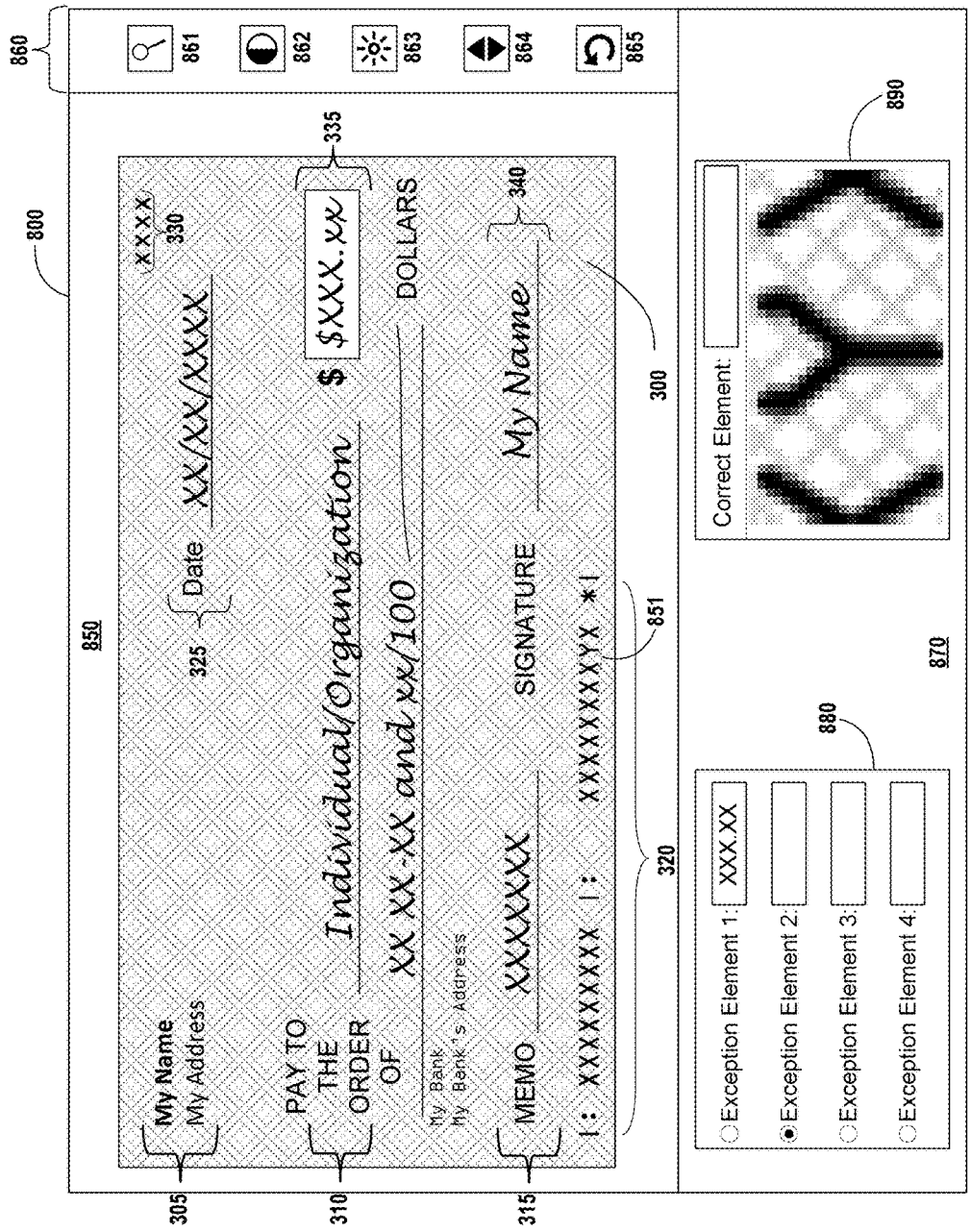

Having thus described embodiments of the invention in general terms, reference will now be made to the accompanying drawings, which are not necessarily drawn to scale, and wherein:

FIG. 1 is a dynamic resource management for document exception processing system environment, in accordance with an embodiment of the invention;

FIG. 2A is a high level process flow illustrating document exception identification and processing, in accordance with an embodiment of the invention;

FIG. 2B is a high level process flow illustrating document exception identification and processing, in accordance with an embodiment of the invention;

FIG. 3 is a high level process flow illustrating identifying and extracting data from payment instruments, in accordance with embodiments of the present invention;

FIG. 4 is an illustration of an exemplary image of a financial record, in accordance with an embodiment of the invention;

FIG. 5 is an illustration of an exemplary template of a financial record, in accordance with an embodiment of the invention;

FIG. 6 is a high level process flow illustrating identifying, extracting, and replacing data from payment instruments, in accordance with an embodiment of the invention;

FIG. 7 is a high level process flow illustrating identifying, extracting, and replacing data from a financial document, in accordance with an embodiment of the invention;

FIG. 8 is an illustration of an exemplary screen shot of a display comprising a financial document and a zoomed-in view of an exception element; and FIG. 9 is an illustration of an exemplary screen shot of a display comprising a financial document and a zoomed-in view of an exception element.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems, methods, and computer program products are described herein that provide for an element level presentation of elements of a payment instrument for exceptions processing. More specifically, the invention involves identifying an exception element from an image of a financial document, determining the location of the exception element based on its coordinates within the image of the financial document, and providing a zoomed-in view of the exception element to the user along with information and resources to allow a user to conveniently conduct accurate analysis of the exception element. The system then receives a correct element from the user to replace the exception element, and then processes the financial document using the replaced correct element instead of the exception element.

FIG. 1 illustrates a dynamic resource management for document exception processing system environment 200, in accordance with some embodiments of the invention. The environment 200 includes a check deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The check deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The check deposit device 211 includes a communication device 212 and an image capture device 215 (e.g., a camera) communicably coupled with a processing device 214, which is also communicably coupled with a memory device 216. The processing device 214 is configured to control the communication device 212 such that the check deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The check deposit device 211 may be a mobile device of the user 210, a bank teller device, a third party device, an automated teller machine, a video teller machine, or another device capable of capturing a check image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated check stack, or misrepresentative checks that may result in a failure to match the check to an associated account for processing. As such, the system may identify the exception and code it for exception processing. Furthermore, the system may utilize the metadata to match the check to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or check processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate check processing. Duplicate checks may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the check deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the check deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 2A, FIG. 2A presents a high level process flow illustrating document exception identification and processing 150, in accordance with some embodiments of the invention. As illustrated in block 120, the method comprises receiving an image of a check. The image received may be one or more of a check, other document, payment instrument, and/or financial record. In some embodiments, the image of the check may be received by a specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the check for storage and exception processing.

As illustrated in block 122, the system may then lift data off of the check (document, payment instrument, or financial record) using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the apparatus may process the check as illustrated in block 126. The apparatus may capture individual pieces of check information from the image of the check in metadata form. In some embodiments, the check information may be text. In other embodiments, the check information may be an image processed into a compatible data format.

As illustrated in block 124, the method comprises storing check information. After the image of the check is processed, the apparatus may store the lifted and collected check information in a compatible data format. In some embodiments, the check information may be stored as metadata. As such, individual elements of the check information may be stored separately, and may be associated with each other via metadata. In some embodiments, the individual pieces of check information may be stored together. In some embodiments, the apparatus may additionally store the original image of the check immediately after the image of the check is received.

As illustrated in block 128, the process 150 continues by identifying exceptions in the document processing. Exceptions may be one or more of irregularities such as bad micro line reads, outdated document stack, misrepresented items, or the like that result in a failure to match the document to an account. In some embodiments, the process may also detect duplicate documents. In yet other embodiments, the system may identify payment stops for specific documents.

Next, as illustrated in block 130, the process 150 continues to batch exceptions for processing and queue them for resource review. In some embodiments, the system may first provide automated decisions for exception processing utilizing the lifted data. In this way, the system may utilize the data lifted from the document in order to rectify the exception identified in block 128. In this way, the system may be able to rectify the exception without having to have an individual manually override the exception and identify the account associated with the document with the exception. In some embodiments, a confidence of the automated decisions for exception processing may be generated. Upon a low confidence or that below a threshold such as 100%, 95%, or 90%, the system may queue the exception to a work flow node for payment instrument processing by a resource. The queue of the resource may be determined based on dynamic resource management described below.

Referring now to FIG. 2B, FIG. 2B presents provides a high level process flow illustrating general data lifting for document exception processing 160, in accordance with some embodiments of the invention. As illustrated in block 132, the process 160 starts by identifying the exceptions in financial document or payment instrument processing. Once identified, the documents associated with each of the one or more exceptions may be categorized as either debit or credit documents, as illustrated in block 134. In this way, the system may identify an exception and identify the type of document that the exception was identified from.

Next, as illustrated in decision block 136, the system may identify if the document is a check or if it is another financial document or payment instrument for processing. If the financial document is a check in decision block 136, the system will identify if the check is a pre-authorized draft check, as illustrated in block 138. In some embodiments, pre-authorized draft checks are made via online purchases that ask a user for his/her check number and routing number. The pre-authorized draft check is subsequently converted to paper form and submitted to the financial institution for processing. These pre-authorized draft checks may undergo a higher level of processing scrutiny to ensure authenticity, if necessary.

Next, as illustrated in block 140, automated decisions are created for the financial documents with exceptions based on lifted data and the type of exception identified. Once automated decisions are made, the system identifies a confidence of the automated decision.

In some embodiments, the system may send the exceptions for processing to a work flow node for exception processing by a resource, as illustrated in block 150. In yet other embodiments, the resource may receive an already automatically processed exception to confirm the correct processing.

Referring now to FIG. 3, FIG. 3 provides a high level process flow illustrating identifying and extracting data from payment instruments 100, in accordance with some embodiments in the invention. One or more devices, such as the one or more systems and/or one or more computing devices and/or servers of FIG. 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. In some embodiments the system may receive financial documents, payment instruments, checks, or the likes.

In some embodiments, each of the check images comprises financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 4 and FIG. 5, it will be understood that any type of financial record image may be received. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

As illustrated in block 106, the check data may be identified based on the applied OCR processing. In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants.

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

As illustrated at block 110, in some embodiments the system will have one or more resources review the unrecognized data. As such, there may be one or more individuals reviewing the unrecognized data instead of mechanically reviewing the data. As illustrated in block 110, the system may receive input from the resource that provides information identifying the unrecognized data. As such, a resource may be provided with the portions of a check image corresponding to the unrecognized data. The resource can view the unrecognized data to translate the unrecognized data into text and input the translation into a check data repository. In this way, the system "learns" to recognize previously unrecognized data identified by the resource, such that when the system reviews the same or similar unrecognized data in the future, such data can be easily identified by reference to the check data repository.

In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator or resource initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, the process 100 continues by determining, based on the confidence level of the resource and initial unrecognized data, determine if a secondary check of the unrecognized data is necessary. As such, based on a confidence level determined from the resource, the system may require additional checking to confirm the accuracy of the identification of the unrecognized data from the check.

Finally, as illustrated in block 112, business strategies and transactions are processed based on at least one of the check data and the inputted information. Data extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

FIG. 4 provides an illustration of an exemplary image of a financial record 300, in accordance with one embodiment of the present invention. The financial record illustrated in FIG. 4 is a check. However, one will appreciate that any financial record, financial document, payment instrument, or the like may be provided.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device may capture an image of the check 300 and transmit the image to a system of a financial institution via a network. The system may collect the check information from the image of the check 300 and store the check information in a datastore as metadata. In some embodiments, the pieces of check information may be stored in the datastore individually. In other embodiments, multiple pieces of check information may be stored in the datastore together.

FIG. 5 illustrates an exemplary template of a financial record 400, in accordance with one embodiment of the present invention. Again, the financial record illustrated in FIG. 5 is a check. However, one will appreciate that any financial record, financial document, payment instruments, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system may "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 6 illustrates a process flow for exception processing 500, in accordance with one embodiment of the present invention. As illustrated in block 502, the process 500 is initiated when financial documents or payment instruments, such as checks, are received. The received financial document may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document as illustrated in block 502, the process 500 continues to compile and store the metadata associated with the received financial documents, as illustrated in block 504. As such, after the image of the document, such as a check, is processed, the system may compile and store the lifted and collected check information as metadata. As such, individual elements of the check information may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in decision block 506, the system monitors the received documents to identify exceptions in the document processing. Exceptions may be one or more of irregularities such as bad micro line reads, outdated document stack, misrepresented items, or the like that result in a failure to match the document to an account intended to be associated with that document. If no exception is identified, then the process 500 terminates.

As illustrated in block 507 the process 500 continues to identify and categorize any identified exceptions into financial documents associated with debits or financial documents associated with credits. As illustrated in block 508 the process 500 continues to confirm the irregularity in the financial document that lead to the exception identification in decision block 506. The irregularity that lead to the exception may be one or more of a bad micro line read, outdated documents (such as an outdated check or deposit statement), or a general failure of the document to match an existing financial account.

Next, as illustrated in block 510, the process 500 continues to utilize the metadata associated with the received financial documents to systematically search for exception resolutions. As such, the system provides automated decisions for exception processing utilizing the lifted metadata. As such, the metadata lifted from the financial documents may be utilized to search the accounts or other records at the financial institution to determine the correct account or record associated with the exception document. For example, the exception may include an outdated check. In this way, one or more of the routing numbers, account numbers, or the like may be incorrectly stated on the check. The system will take the data on that outdated check and convert it to a metadata format. Thus, the system will utilize the metadata format of the routing number or the like to search the financial institution records to identify that that particular routing number was used for a batch of checks for User 1. As such, the system will identify the correct user, User 1 associated with the check that had an exception. Other examples may include one or more of bad micro line reads, document or check format issues, or the like.

As such, the system may utilize the metadata lifted from the document in order to rectify the exception identified in decision block 506. In this way, the system may be able to rectify the exception without having to have an individual manually override the exception and identify the account associated with the document with the exception.

Next, as illustrated in block 512, the process 500 continues by determining a confidence associated with the systematic resolution for exception resolution. In this way, a confidence of the automated resolution is determined. If the confidence is not satisfactory, such as not being above a pre-determined threshold, the system may send the exception to a resource based on the confidence score not reaching a pre-determined threshold, as illustrated in block 518. Next, as illustrated in block 520, the system may place the resolved exception into financial document processing after resolution and confirmation from the resource.

Referring back to block 512 of FIG. 6, if a confidence is generated significantly high enough to reach the pre-determined threshold, the system continues and automatically and systematically corrects the exception based on the match based on the confident systematic resolution, as illustrated in block 514. In some embodiments, there may be one or more threshold confidences related to the exception. As such, if a match has been made between the metadata and a financial account and it is above a pre-determined confidence, then the system may automatically correct the exception. However, in some embodiments, the system may request manual acceptance of the correction of the exception.

Finally, as illustrated in block 516, the corrected financial document may be placed back into the financial document processing for continued processing after the exception has been identified and corrected via systematic searching financial institution data utilizing metadata extracted from the original financial document with an exception.

FIG. 7 illustrates a process flow for exception processing 700, in accordance with one embodiment of the present invention. As illustrated in block 702, the process 700 is initiated when an image of a financial document or payment instrument, such as a check, is received. The system may save the image of the financial document in any file format that is compatible with optical character recognition (OCR) processes.

Once the system has received and stored the image of the financial document as illustrated in block 702, the process 700 continues to process the financial document by lifting financial data elements off of the financial document using OCR, as illustrated in block 704. As such, the system may use OCR processes to scan the entire financial document, identify elements of the financial document, lift the elements from the financial document, and store the elements for further processing. In some embodiments, an element is a section of the image of the financial document, as described previously. In other embodiments, an element is a string of associated characters, alphanumeric or otherwise, that represents a piece of financial record data. In other embodiments, an element is a single character, alphanumeric or otherwise, that represents a single component of a piece of financial record data. The lifted element may be stored in a database within the system or in an external database accessible by the system through a communicable network.

In certain circumstances, the OCR process cannot properly identify an element in the image of the financial document. When the OCR cannot properly identify an element during its processing of the image of the financial document, the system identifies this unidentifiable element as an exception element, as illustrated in block 706. The OCR may not be able to properly identify the exception element for many reasons. In some embodiments, the exception element may be a stray mark on the financial document that is not intended to have financial or legal significance. In other embodiments, the exception element is a letter or numeral, where the writer intended for it to carry financial or legal significance, but the letter or numeral was not transcribed in a manner that the OCR process can understand. In some cases, the exception element was properly transcribed, but a subsequent mark disrupts the OCR process's ability to identify the element or match it with a known character. Additionally, the OCR may not be sophisticated enough to identify the element as a known character. In any embodiment, the OCR process cannot confidently identify or match the exception element with a known character and the exception element needs to be reviewed by a person to determine whether the exception element is actually identifiable or if the entire financial document needs to be removed from processing. While the following steps refer to a single exception element within the image of the financial document, it is possible for the system to identify multiple exception elements within the same image of the financial document. As such, the following steps may be repeated for each identified exception element.

If no exception element is discovered by the system or the OCR process, then no further exception analysis would be necessary as the lifted elements of the image of the financial document are already in a format that is fully readable by the financial document processor discussed in block 718. However, when an exception element is identified, the financial document processor cannot process the financial document because at least one term is unknown to the processor. As such, this system is designed to address the issues posed by exception elements that are difficult to decipher, and ultimately reformats the data associated with the image of the financial document such that the financial document processor can read and therefore process all of the information provided by all of the elements in the image of the financial document.

After identifying the exception element from the image of the financial document, they system then determines the coordinates of the exception element, where the coordinates provide a location of the exception element within the image of the financial document, as illustrated in block 708. As such, the system may categorize the financial document as a two or three dimensional area and apply coordinate axes to the image of the financial document. The system may then identify the exception element within the image of the financial document, identify the given coordinates of the image of the financial document associated with the location of the identified exception element, and store the identified coordinate data with information concerning the exception element. In some embodiments, the coordinates are based on pixels or voxels (e.g., a coordinate of "3 along the X-axis" for a two-dimensional image equates to three pixels across the X-axis). In other embodiments, the coordinates are based on a unit of measure, such as centimeters, millimeters, inches, and the like.

In some embodiments, the identified coordinates are coordinates to a single point in the image of the financial document. This single point may be any location within the area covered by the exception element such as the center, the top-left corner, the bottom-right corner, and the like. In other embodiments, the identified coordinates are a range of coordinates that demarcate an area of the image of the financial document that surrounds and/or contains the exception element.

In some embodiments of the invention, the system identifies the coordinates of the exception element on the financial document. In other embodiments, an organization separate from the financial institution that owns and uses the system performs the OCR process and identifies the coordinates of the exception element. In such an embodiment, the separate organization may provide the coordinates and any relevant information regarding the exception element to the financial institution and/or to the system.

Once the system has determined, or received, the coordinates of the exception element, the system provides a zoomed-in view of the financial document to a user at the determined coordinates. The system may provide this view to the user through a user interface on a user device. The user device may be a physical device that is part of the financial institution's system. In other embodiments, the user device is separate from the financial institution system, but is in communication with the financial institution system through a network. The term "user," as used in reference to this process 700 refers to an employee or contractor for the financial institution with specialized skills in identifying a character on a financial document that may not be discernible by an OCR process.

By zooming in on the exception element, the system provides an enlarged, clear image to the user, allowing the user to more easily determine the correct element for the exception element. The term "correct element" refers to the element actually intended by the writer of the character, as discerned by the user. The zoomed-in view of the exception element may be presented on a screen, projection, or other viewing apparatus. The enlarged form of the presentation of the exception element provides a convenient medium for the user to analyze the exception element and therefore aids the user in making a more accurate decision about the correct element.

In some embodiments, the system allows a user to zoom out from the exception element so that the user can use other information found in the image of the financial document in making a correction decision. For example, zooming out from the image may allow the user to see that similar, but more legible, elements are included elsewhere in the image of the document, and the user can use this information to determine that the exception element is the same as this frequent character. In other embodiments, zooming out from the exception element may allow the user to identify the area of the financial document in which the exception element is located. For example, the user may zoom out of the exception element to determine that the exception element is a part of the MICR line, and therefore should be a number. The user may then zoom back in to the exception element to see the enlarged image of the exception element and conduct a better analysis of what the correct element is. In some embodiments, when the user zooms out from the exception element, the zoomed out image may include an outline or other highlighting feature around the exception element such that the user may easily determine where the exception element is located on the financial instrument overall. In some embodiments, the system provides both an enlarged and a zoomed-out version of the image exception element and the whole image of the financial instrument, respectively.

In some embodiments, exception element information may be conveyed to the user along with the zoomed-in view of the image of the financial document. Examples of exception element information include a likely location of the exception on the financial document, possible correct elements, and a confidence score associated with the exception element.

The confidence score associated with the exception element can greatly assist the system, as well as the user and the financial institution as a whole, in effectively and efficiently processing the financial document associated with the exception element. The system and/or the OCR process may analyze each element based on their inventories of expected characters for a financial document, and assign a confidence score for each element. In some embodiments, the system uses a threshold confidence score to determine which elements from the image of the financial document are confidently identified enough to pass through to further processing, and which elements are not yet confidently identified, and need to be flagged as exception elements. An exception element with a confidence score that was close to the threshold may, on average, be analyzed by a user in a faster time than an exception element with a lower confidence score since the confidence score is associated with readability and ease of identification. Additionally, exception elements with very low confidence scores may require an expert, beyond the normal specialized employee, to perform the exception element analysis. As such, the system may use the confidence scores of each exception element to determine which user to provide each exception element to, based on the expected work load and relative expertise of the users.

The system and/or the OCR process may also determine confidence scores for each possible correct element, based on the analysis of the exception element. For example, the system may not be able to easily discern which character the exception element actually is, but the system can determine that the exception element is likely a first number or a second number because these two numbers have a confidence score above a threshold for possible correct exception elements. The system may then provide these two possible correct elements to the user and not provide any other possible correct elements to the user, allowing the user know which possible correct elements are most likely to be the intended element. The system may also provide the confidence score for each of the possible correct elements to the user so that the user may understand which elements are more likely than others to be the correct element. In some embodiments, the system may color code the possible correct elements so that the user may easily visually perceive the likelihood of each possible correct element being the actual correct element. In similar embodiments, the system may provide a keyboard (physical, touch-screen, or otherwise) that includes all possible financial document characters, but then the system lights up only the characters above the threshold confidence score. Additionally, the system may provide a similar keyboard that lights up at least some of the keys based on the relative strength of their confidence scores. For example, the keys associated with elements that the system is most confident about the likelihood of the element being a correct element could be lit up in red, the keys that the system is somewhat confident in can be lit up in yellow, and the keys that the system is not confident in could be lit up in green. These visual aspects help the system more easily associate confidence scores with their associated elements, allowing the user to make more informed decisions in the exception element analysis.

To enhance the user's ability to examine the exception element, the system may provide, via the user interface, a method for the user to manipulate characteristics of the image. For example, the system may allow the user to further zoom in on one aspect of the exception element, such as the top right quadrant, to better analyze the markings shown in the image. This additional zoom may be conducted via touch-screen mechanics, a mouse, a keyboard, or other navigation mechanisms. Other examples of methods provided by the system to allow the user to manipulate the image of the exception element include methods for adjusting the brightness of the exception element image, contrast of the exception element image, back-lighting of the display screen, color settings of the exception element image, and the like. Note that the adjustments in brightness, contrast, and color settings of the exception element image may allow for an improved readability of the exception element image while not affecting the normal view of the display component of the user interface. Therefore, the user may be able to manipulate the exception element image to better understand its characteristics while not affecting the image of the entire financial document that is concurrently displayed on the display component of the user interface.

In providing a zoomed-in view of the financial document to the user, the system may also provide some response features to aid the user in selecting the correct element to replace the exception element. One such response feature is to provide possible correct elements on the display of the user interface. For example, the system may determine that the exception element is either a first number or a second number, but the system cannot confidently determine which of the first and second numbers is the correct element. As such, the system may provide only the first and second number to the user, giving the user the option of selecting one of these two numbers. By limiting the quantity of possible numbers displayed to the user, the system can decrease the number of user errors from selecting the incorrect element to replace the exception element. In some embodiments of the system, the user interface is a touch-screen. One issue with typing or selecting icons on a touch-screen is that the icons tend to be small and close enough together that mistyping occurs. To remedy the issue of mistyping, the system may present only the replacement elements that the system and/or the OCR process identifies as possible correct elements to the user in a manner where the selectable icons for each possible element are spread far enough apart from each other that the likelihood of the user mistyping is significantly reduced.

In some embodiments, the selectable possible elements are presented on the same display as the enlarged view of the exception element. In other embodiments, the user may view the enlarged view of the exception element on one screen and then be presented with the selectable possible elements on a second display.

Once the system has presented the zoomed-in view of the financial document to the user at the determined coordinates, the system then prompts the user to select a correct element, as illustrated in block 712. The correct element is the element that the user determines, using skill, training, and analysis, to be the element originally intended by the writer or printer of the character that makes up the element. In some circumstances, the element cannot be discerned by the user, and the user may flag the financial document as impossible to further process or send the image of the financial document to a supervisor or alternate expert for further exception element processing.

The user may select the correct element by touching an icon presented to the user as a possible correct element, as discussed in regards to block 710. In some embodiments, the user may select the correct element by typing the associated key on a traditional keyboard connected to the system. In other embodiments, the system may have provided a specialized keyboard to the user, where the specialized keyboard includes only keys that may be relevant to financial instruments, and may include keys associated to characters not included on a traditional keyboard. In some embodiments, the specialized keyboard is manipulated by the system for each exception element review. For example, the specialized keyboard may be a touch-screen device with different potential elements presented to the user for each exception element analysis. As discussed above, in this embodiment, the touch-screen icons may be at least as large as a normal human fingertip, and the icons may be spaced apart to a distance that substantially reduces the risk of the user mistyping an incorrect icon. Alternatively, the specialized keyboard may be in a form substantially similar to a modern keyboard, but the system may lock certain keys during each exception analysis review such that the user may not select keys representing characters that the system is confident could not be the correct element.

In some embodiments, the system may provide a method for selecting the correct element from the user that uses audible commands as the input instead of, or in conjunction with, keyboard or touch-screen mechanisms. For example, the system may provide, as part of the user interface, a microphone that can receive a voice input from the user. In such embodiments, the user may analyze the zoomed-in view of the exception element, determine the correct element based on this analysis, and then provide an audible response to the system, which can interpret the audible command as a selection of a correct element.

In some embodiments, the system may provide a method for selecting the correct element from the user that uses visual commands as the input instead of, or in conjunction with, keyboard or touch-screen mechanisms. For example, the system may provide, as part of the user interface, one or more cameras focused on the user. The one or more cameras may analyze the user's eyes to determine the location that the user is looking on the display of the exception element, and/or the provided possible correct elements, to determine which suggested element is being selected by the user.

In all embodiments, the user may have the option to override the system's suggested options for the correct element, allowing the user to provide a different correct element based on the user's analysis of the exception element. For example, the system may incorrectly believe that the exception element is one of two numbers, but the user then determines that the exception element is, in fact, a letter, so the user may override the system's options and select the correct letter character.

The process 700 then continues with the system receiving the user's selection of the correct element, as illustrated in block 714. As discussed above, the user's selection may be received by the user interface provided to the user, and then communicated by the user device to the financial institution's system. In embodiments where the user device is part of the financial institution's system, the user's selection may be received directly from the user device. In other embodiments, the user's selection is communicated to the financial institution's system via a network. The system may then save the user's selection in a database for further processing of the image of the financial document. As such, the system may save the user's selection in a manner that associates the user's selection of the correct element with the other information regarding the image of the financial document already saved on a database in the system.

After receiving the user's selection of the correct element, the system then replaces the exception element with the selected correct element, as illustrated in block 716. In some embodiments, this replacement is a literal replacement of the exception element's area on the image of the financial document with a substantially identically sized correct element image. In other embodiments, the system's process of lifting elements from the image of the financial document included placing the elements in respective files associated with the financial information of which the element is a component. In such embodiments, the step of replacing the exception element with the selected correct element may include replacing or providing the correct element to the correct file and/or location within the financial information database associated with the financial information that the exception element was a part of.

Once all exception elements from an image of a financial document have been replaced, the system may then process the financial document based on the lifted elements of the image of the financial document and the selected correct elements, as illustrated in block 718. Because the correct elements have replaced the exception elements that were preventing the data associated with the image of the financial document from being processed, the entire group of data associated with the image of the financial document is now in a format that can be read and processed by the system. In some embodiments, the system includes a financial document processor. In other embodiments, the system sends the information associated with the image of the financial document, including the correct element replacing the exception element, to an external processor, via the network. In any embodiment, the system is now providing a data set to a processor that previously was not able to process the data set until the correct element replaced the exception element.

To clarify the benefits of the system, the processes of providing a zoomed-in view of the financial document at the exception element, along with providing tools and information to the user associated with the financial document, the exception element, and/or the possible correct elements, allows the user to more conveniently and accurately identify the correct element that should replace the exception element. This improved system of identifying correct elements for an image of a financial document allow the system to more easily process a financial document that would not otherwise be readable by a financial document processor.

Turning now to FIG. 8, an illustration of an exemplary screen shot of a display 800 comprising a financial document and a zoomed-in view of an exception element is presented. As previously discussed, the display may be a component of the user interface associated with the user. The user interface may also comprise a navigation mechanism and a user input mechanism to navigate the display and provide instructions and other information to the system.

As illustrated in FIG. 8, the display 800 comprises a financial document image window 850, a manipulation window 860, and an element presentation window 870. The financial document image window 850 comprises an image of a financial document 300, with components as described in FIG. 4. The financial document image window also comprises an exception element frame 851. As illustrated in FIG. 8, the exception element frame 851 surrounds the element of the amount of the check 335. The term "element" used in this FIG. 8 refers to an entire field of the financial document, and not necessarily a single character within a field. The exception element window 851 highlights the area on the full image of the financial document 300 that comprises the exception element, as determined by the system. By highlighting the area around the exception element, the system allows a user to quickly identify where the exception element is located on the full image of the financial document, giving the user the ability to put the exception element into context.

The element presentation window 870 comprises an exception element list 880 and a determination window 890. The exception element list 880 is a list of the exception elements determined by the system to exist in the image of the financial document 300. Four exception elements are listed in this example screenshot of the display 800, but any number of exception elements could be listed, depending on the number of exception elements identified. The determination window 890 is the region of the display 800 that provides a zoomed-in view of the image of the financial document at the determined coordinates, thereby providing an enlarged view of an exception element. The exception element shown in FIG. 8 is the amount of the check 335, as outlined by the exception element window 851. The determination window also comprises an input for the correct element, above the enlarged view of the financial image document. This input for the correct element is where the user may input the determined correct element that is to replace the exception element, based on the user's analysis of the zoomed-in view of the exception element.

The manipulation window 860 comprises a zoom tool 861, a contrast tool 862, a brightness tool 863, a navigation tool 864, and an undo tool 865. The zoom tool 861 gives the user the ability to adjust the level of zoom presented to the user in the determination window 890. For example, the user may want a closer look at the exception element to determine whether a portion of the exception element is an intentional mark from the creator of the financial document or a smudge or other unintentional mark. As such, the zoom tool 861 allows the user to zoom in to a portion of the image of the financial instrument that is smaller than the exception element. Additionally, the user may want to zoom out of the exception element to get a better understanding of the context surrounding the exception element, while still in an enlarged view.

The contrast tool 862 in the manipulation window 860 gives the user the ability to adjust the image contrast of the zoomed-in view of the image of the financial instrument, as shown in the determination window 890. Importantly, the contrast tool 862 only adjusts the contrast of the zoomed-in view of the exception element, and does not affect the contrast of the image of the financial document 300. By only adjusting the contrast of the exception element in the determination window 890, the contrast tool 862 allows the system to present the user with a more detailed and precise image of the exception element, which in turn allows the user to make more accurate decisions in selecting the correct element. By not adjusting the contrast of the image of the financial document 300 in the financial document image window 850, the system provides a normalized view of the image of the financial document 300 to the user that helps the user better understand the context for the exception element.

The brightness tool 863 in the manipulation window 860 gives the user the ability to adjust the brightness of the zoomed-in view of the image of the financial instrument, as shown in the determination window 890. Like with the contrast tool 862, the brightness tool 863 only adjusts the brightness of the zoomed-in view of the image of the financial document that is presented to the user in the determination window 890, and does not adjust the brightness in the financial document image window 850.

The navigation tool 864 in the manipulation window 860 gives the user the ability to navigate between each exception element in the exception element list 880. As such, the user may make one determination for Exception Element 1, then navigate to an Exception Element 2, as illustrated in FIG. 9. By allowing the user to navigate between the identified exception elements for an image of a financial document, the navigation tool 864 lets a user quickly and efficiently analyze each exception element in succession. In some embodiments, the different exception elements are exception elements from the same financial document. In other embodiments, the different exception elements are exception elements from different images of financial documents. In some embodiments, the different exception elements are a combination of exception elements from the same and from different images of financial documents.

Finally, the undo tool 865 in the manipulation window 860 allows a user to undo any changes made to the display from the zoom tool 861, the contrast tool 862, the brightness tool 863, the navigation tool 864, and the user-inputted correct elements. For example, the user may have significantly adjusted the contrast and brightness of the zoomed-in view of the exception element in the determination window 890, and the undo tool 865 will provide a quick and efficient way of returning the displayed view in the determination window 890 to its original format.

FIG. 9 illustrates a second view of the display 800, in accordance to embodiments of the invention. As shown in FIG. 9, the current view is a continuation of a user's session with the system that began in FIG. 8, where the user input a correct element for Exception Element 1 and used the navigation tool 864 to move to Exception Element 2. The exception element window 851 is now outlining a single character from the routing number term of the image of the financial document 300. As such, the definition of "element," with regard to FIG. 9, refers to a single character within a term of the image of the financial document 300. By presenting a zoomed-in view of a single character in the determination window 890, the system provides a view that is more enlarged than if the entire routing number had been presented in the determination window 890, thus allowing the user to view a more detailed image of the specific exception element. For clarification purposes, the exception element in FIG. 9 is the "Y" character in the routing number term. The same tools from the manipulation window 860 are available to the user as in FIG. 8, providing a detailed and efficient system for analyzing exception elements in an image of a financial document.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 6574US1.014033.2458 | 14/750,419 now published as 2016/0379186 | ELEMENT LEVEL CONFIDENCE SCORING OF ELEMENTS OF A PAYMENT INSTRUMENT FOR EXCPETIONS PROCESSING | Concurrently Herewith |
| 6575US1.014033.2459 | 14/750,666 now published as 2016/0379199 | ENSURING BATCH INTEGRITY IN A PAYMENT INSTRUMENT EXCEPTIONS PROCESSING SYSTEM | Concurrently Herewith |
| 6587US1.014033.2460 | 14/750,684 now published as 2016/0379180 | MONITORING MODULE USAGE IN A DATA PROCESSING SYSTEM | Concurrently Herewith |
| 6629US1.014033.2461 | 14/750,380 now published as 2016/0379184 | DYNAMIC RESOURCE MANAGEMENT ASSOCIATED WITH PAYMENT INSTRUMENT EXCEPTIONS PROCESSING | Concurrently Herewith |

-continued

| Docket Number | U.S. patent application Ser. No. | Title | Filed On |
|---|---|---|---|
| 6589US1.014033.2462 | 14/750,393 now published as 2016/0379185 | PREDICTIVE DETERMINATION AND RESOLUTION OF A VALUE OF INDICIA LOCATED IN A NEGOTIABLE INSTRUMENT ELECTRONIC IMAGE | Concurrently Herewith |

What is claimed is:

1. A system for element level presentation of elements of a payment instrument for exceptions processing is provided, said system comprising:

a computing platform comprising one or more processing devices and executable software code stored in one or more electronic storage devices, wherein the executable software code is configured to cause the one or more processing devices to:

receive an image of a financial document;

lift financial data off of the financial document using optical character recognition;

store the financial data as information related to the financial document;

identify an exception element in financial document processing, wherein the exception element is not discernible by the system, and wherein the system cannot process the information related to the financial document with the exception element;

determine coordinates of the exception element within the image of the financial document;

cause a user interface of the computing platform to display a first section comprising a zoomed-in view of the exception element at the coordinates of the exception element within the image of the financial document and a second section comprising a full view of the image of the financial document, wherein the user interface of the computing platform comprises:

a display comprising (1) a brightness control that, when adjusted by a user, manipulates a brightness of the first section of the user interface but does not affect a brightness of the second section of the user interface, and (2) a contrast control that, when adjusted by the user, manipulates a contrast of the first section of the user interface, but does not affect a contrast of the second section of the user interface, a navigation mechanism, and a user input mechanism comprising selectable icons associated with one or more possible correct elements, wherein a confidence level for each of the one or more possible correct elements is displayed along with the selectable icons associated with the one or more possible correct elements;

cause the user interface of the computing platform to display a prompt to the user to select a correct element from the selectable icons associated with the one or more possible correct elements, wherein the correct element is an element intended by a creator of the exception element;

receive the user selection of the correct element;

replace the exception element with the selected correct element, wherein replacing the exception element converts the information related to the financial document into a format that can be processed by the system; and process the financial document based on the information related to the financial document and the selected correct element.

2. The system of claim 1, wherein the navigation mechanism is configured for further manipulating an amount of zoom, relative to the exception element.

3. A computer implemented method for element level presentation of elements of a payment instrument for exceptions processing is provided, said computer implemented method comprising:

receiving, via a processing device, an image of a financial document;

lifting, via a processing device, financial data off of the financial document using optical character recognition;

storing, via a processing device, the financial data as information related to the financial document;

identifying, via a processing device, an exception element in financial document processing, wherein the exception element is not discernible by the system, and wherein the system cannot process the information related to the financial document with the exception element;

determining, via a processing device, coordinates of the exception element within the image of the financial document;

displaying, via a user interface of a computing platform, a first section comprising a zoomed-in view of the exception element at the coordinates of the exception element within the image of the financial document and a second section comprising a full view of the image of the financial document, wherein the user interface of the computing platform comprises:

a display comprising (1) a brightness control that, when adjusted by a user manipulates a brightness of the first section of the user interface but does not affect a brightness of the second section of the user interface, and (2) a contrast control that, when adjusted by the user, manipulates a contrast of the first section of the user interface, but does not affect a contrast of the second section of the user interface, a navigation mechanism, and a user input mechanism comprising selectable icons associated with one or more possible correct elements, wherein a confidence level for each of the one or more possible correct elements is displayed along with the selectable icons associated with the one or more possible correct elements;

causing, via a processing device, the user interface of the computing platform to display a prompt to the user to select a correct element from the selectable icons associated with the one or more possible correct elements, wherein the correct element is an element intended by a creator of the exception element;

receiving, via the user interface, the exception element with the selected correct element, wherein replacing the exception element converts the information related to the financial document into a format that can be processed by the system; and processing, via a processing device, the financial document based on the information related to the financial document and the selected correct element.

4. The computer implemented method of claim 3, wherein the navigation mechanism is configured for further manipulating an amount of zoom, relative to the exception element.

5. A computer program product for element level presentation of elements of a payment instrument for exceptions processing is provided, the computer program product comprising a non-transitory computer readable medium comprising computer readable instructions, the instructions comprising instructions for:

receiving an image of a financial document;

lifting financial data off of the financial document using optical character recognition;

storing the financial data as information related to the financial document;

identifying an exception element in financial document processing, wherein the exception element is not discernible by the system, and wherein the system cannot process the information related to the financial document with the exception element;

determining coordinates of the exception element within the image of the financial document;

causing a user interface of a computing platform to display a first section comprising a zoomed-in view of the exception element at the coordinates of the exception element within the image of the financial document and a second section comprising a full view of the image of the financial document, wherein the user interface of the computing platform comprises:

a display comprising (1) a brightness control that, when adjusted by a user, manipulates a brightness of the first section of the user interface but does not affect a brightness of the second section of the user interface, and (2) a contrast control that, when adjusted by the user, manipulates a contrast of the first section of the user interface, but does not affect a contrast of the second section of the user interface, a navigation mechanism, and a user input mechanism comprising selectable icons associated with one or more possible correct elements, wherein a confidence level for each of the one or more possible correct elements is displayed along with the selectable icons associated with the one or more possible correct elements;

causing the user interface of the computing platform to display a prompt to the user to select a correct element from the selectable icons associated with the one or more possible correct elements, wherein the correct element is an element intended by a creator of the exception element;

receiving the user selection of the correct element;

replacing the exception element with the selected correct element, wherein replacing the exception element converts the information related to the financial document into a format that can be processed by the system; and processing the financial document based on the information related to the financial document and the selected correct element.

6. The computer program product of claim 5, wherein the navigation mechanism is further configured for further manipulating an amount of zoom, relative to the exception element.

7. The system of claim 1, wherein the financial document comprises a check.

8. The system of claim 7, wherein the exception element comprises a character from a handwritten numerical amount of the check.

9. The system of claim 7, wherein the exception element comprises a character from a handwritten alphabetic amount of the check.

10. The system of claim 7, wherein the exception element comprises a character from a handwritten alphabetic or numeric date of the check.

11. The computer implemented method of claim 3, wherein the financial document comprises a check.

12. The computer implemented method of claim 11, wherein the exception element comprises a character from a handwritten numerical amount of the check.

13. The computer implemented method of claim 11, wherein the exception element comprises a character from a handwritten alphabetic amount of the check.

14. The computer implemented method of claim 11, wherein the exception element comprises a character from a handwritten alphabetic or numeric date of the check.

15. The computer program product of claim 5, wherein the financial document comprises a check.

16. The computer program product of claim 15, wherein the exception element comprises a character from a handwritten numerical amount of the check.

17. The computer program product of claim 15, wherein the exception element comprises a character from a handwritten alphabetic amount of the check.

18. The computer program product of claim 15, wherein the exception element comprises a character from a handwritten alphabetic or numeric date of the check.

* * * * *